(12) United States Patent
Harz et al.

(10) Patent No.: US 7,556,802 B1
(45) Date of Patent: *Jul. 7, 2009

(54) POLYMER-COATED, GRANULATED ENZYME-CONTAINING FEED ADDITIVES AND METHOD FOR THE PRODUCTION THEREOF

(75) Inventors: Hans-Peter Harz, Dudenhofen (DE); Roland Betz, Niederkirchen (DE); Franz-Josef Schöner, Edenkoben (DE); Gabriel Marinus H. Meesters, Delft (NL); Carl Sidonius Maria Andela, Delft (NL)

(73) Assignee: BASF SE (DE)

( * ) Notice: Subject to any disclaimer, the term of this patent is extended or adjusted under 35 U.S.C. 154(b) by 28 days.

This patent is subject to a terminal disclaimer.

(21) Appl. No.: 10/018,339

(22) PCT Filed: Jun. 23, 2000

(86) PCT No.: PCT/EP00/05793

§ 371 (c)(1),
(2), (4) Date: Dec. 19, 2001

(87) PCT Pub. No.: WO01/00042

PCT Pub. Date: Jan. 4, 2001

(30) Foreign Application Priority Data

Jun. 25, 1999 (DE) ................................ 199 29 257

(51) Int. Cl.
*A61K 38/54* (2006.01)
*C12N 11/02* (2006.01)
(52) U.S. Cl. ...................... 424/94.3; 435/177
(58) Field of Classification Search ................. 435/174, 435/177; 424/94.1, 94.3
See application file for complete search history.

(56) References Cited

U.S. PATENT DOCUMENTS

| | | | |
|---|---|---|---|
| 2,991,226 A * | 7/1961 | Millar et al. ................. | 424/471 |
| 4,106,991 A | 8/1978 | Markussen et al. | |
| 4,689,297 A | 8/1987 | Good et al. | |
| 4,919,841 A | 4/1990 | Kamel et al. | |
| 4,973,417 A | 11/1990 | Falholt | |
| 4,976,977 A * | 12/1990 | Johnson et al. ................ | 426/96 |
| 5,080,917 A * | 1/1992 | Itoh et al. ..................... | 426/96 |
| 5,186,937 A | 2/1993 | Sparks et al. | |
| 5,271,881 A | 12/1993 | Redding, Jr. | |
| 5,391,371 A * | 2/1995 | Jacobsen et al. ........... | 424/94.2 |
| 5,827,709 A | 10/1998 | Barendse et al. | |
| 5,837,291 A | 11/1998 | Maruyama et al. | |
| 5,856,451 A | 1/1999 | Olsen et al. | |
| 5,879,920 A | 3/1999 | Dale et al. | |
| 5,972,669 A | 10/1999 | Harz et al. | |
| 6,016,828 A | 1/2000 | Machledt | |
| 6,083,538 A | 7/2000 | Plijter et al. ................. | 426/20 |
| 6,103,678 A | 8/2000 | Masschelein et al. | |
| 6,106,828 A | 8/2000 | Bisgard-Frantzen et al. | |
| 6,120,811 A | 9/2000 | Ghani | |
| 6,136,772 A * | 10/2000 | De Lima et al. ............ | 510/392 |
| 6,475,546 B1 | 11/2002 | Harz et al. | |
| 6,500,426 B1 * | 12/2002 | Barendse et al. .......... | 424/94.1 |
| 6,589,929 B2 | 7/2003 | De Lima et al. | |
| 2002/0034549 A1 * | 3/2002 | Becker et al. ............... | 424/489 |
| 2002/0094367 A1 | 7/2002 | Fuglsang et al. | |
| 2003/0049811 A1 * | 3/2003 | Barendse et al. ........... | 435/179 |
| 2003/0054511 A1 * | 3/2003 | Andela et al. ............... | 435/180 |
| 2005/0163765 A1 | 7/2005 | Andela et al. | |

FOREIGN PATENT DOCUMENTS

| | | |
|---|---|---|
| CA | 2 376 811 A1 | 1/2001 |
| DE | 199 29 257 A1 | 12/2000 |
| EP | 0 193 829 A2 | 9/1986 |
| EP | 257 996 | 3/1988 |
| EP | 0 501 375 A1 | 9/1992 |
| EP | 0 628 630 A2 | 12/1994 |
| EP | 0 569 468 B1 | 4/1995 |
| EP | 0 758 018 A1 | 2/1997 |
| EP | 0 913 468 A2 | 5/1999 |
| FR | 2 678 144 A1 | 12/1992 |
| GB | 1 362 365 | 8/1974 |
| GB | 1 483 591 | 8/1977 |
| GB | 2 167 758 A | 6/1986 |
| JP | 06-217716 | 8/1994 |
| JP | 6305960 | 11/1994 |
| JP | 07-236430 | 9/1995 |
| JP | 8109126 | 4/1996 |
| JP | 408333239 A * | 12/1996 |
| WO | WO-85/05288 A1 | 12/1985 |
| WO | WO-88/01512 A1 | 3/1988 |
| WO | WO-91/06638 A1 | 5/1991 |
| WO | WO 92/12645 | 8/1992 |
| WO | WO-93/07260 | 4/1993 |

(Continued)

OTHER PUBLICATIONS

Webster's II New Riverside Dictionary (1984) (Hought-Mifflin: Boston, M) p. 478.*
Thoma et al. "Influence of aqueous coatings . . . " Eur. J. Pharma. Biopharma. (Jan. 1999) 47(1): 39-50.*
U.S. Appl. No. 09/959,985, Harz et al.
Database WPI, Section CH, Week 199809 Derwent Publications Ltd., London, GB, Class A25, AN 1998-101045, XP002140307.
Mayer et al., "Herstellung magensaftresistent überzogener Enzympräparate für den Einsatz als Verdauungshilfen in der Tierernährung," *Wien. Tierärztl. Mschr.*, vol. 81, pp. 103-107 (1994).

*Primary Examiner*—Irene Marx
*Assistant Examiner*—Susan Hanley
(74) *Attorney, Agent, or Firm*—Connolly Bove Lodge & Hutz LLP

(57) ABSTRACT

A process is described for producing a polymer-coated, granulated, enzyme-containing feedstuff additive, the polymer-coated feedstuff additives obtainable in this manner and pelleted feedstuff compositions which are produced with use of the polymer-coated additives.

17 Claims, 2 Drawing Sheets

FOREIGN PATENT DOCUMENTS

| | | |
|---|---|---|
| WO | WO 94/26883 | 11/1994 |
| WO | WO-96/22028 A1 | 7/1996 |
| WO | WO 97/12958 | 4/1997 |
| WO | WO-97/16076 A1 | 5/1997 |
| WO | WO-97/23606 A1 | 7/1997 |
| WO | WO-97/39116 A1 | 10/1997 |
| WO | WO-98/01544 A1 | 1/1998 |
| WO | WO 98/5490 | 12/1998 |
| WO | WO-98/55599 A2 | 12/1998 |
| WO | WO-99/30671 A2 | 6/1999 |
| WO | WO 99/51210 | 10/1999 |
| WO | WO-99/55310 A1 | 11/1999 |
| WO | WO 00/36927 | 6/2000 |
| WO | WO 00/47060 | 8/2000 |
| WO | WO-01/00042 A1 | 1/2001 |
| WO | WO-01/25411 A1 | 4/2001 |

* cited by examiner

POLYMER-COATED, GRANULATED ENZYME-CONTAINING FEED ADDITIVES AND METHOD FOR THE PRODUCTION THEREOF

RELATED APPLICATIONS

This application is a national stage application (under 35 U.S.C. 371) of PCT/EP00/05793 filed Jun. 23, 2000, which claims the benefit of German application 19929257.4 filed Jun. 25, 1999.

The present invention relates to novel processes for producing polymer-coated, granulated enzyme-containing feedstuff additives, the polymer-coated granules produced in this manner, and pelleted feedstuff compositions which are obtainable with the use of the polymer-coated granules.

It is generally customary to add enzymes to animal feed in order to ensure improved feed utilization. In addition, it is conventional practice to supply animal feed in pelleted form, since pelleting not only facilitates feed uptake, but also improves the handling of the feed. Furthermore, it has been found that certain feed constituents are digested better as a result of pelleting and constituents added to the feed, for example vitamins, enzymes, trace elements, can be better incorporated into the feed mixture.

To improve the keeping quality of such feed preparations, in addition, a heat treatment is advantageous. A heat treatment is also performed in the context of pelleting necessary for conditioning, in which the feed is exposed to steam and as a result is heated and moistened. During the actual pelleting step, the feed is forced through a matrix (perforated plate). Other processes used in the feedstuff industry are extrusion and expansion. The action of heat in all these processes is a problem, in particular when enzymes, which are generally thermally unstable, are present in the composition. Therefore, various efforts have been made to improve the thermal stability, and in particular the pelleting stability, of enzyme-containing feedstuff compositions.

EP-A-0 257 996, for example, proposes stabilizing enzymes for feed mixtures by pelleting them in a mixture with a support which is mainly cereal flour.

WO 92/12645 proposes incorporating feedstuff enzymes into what is called T-granulate. This T-granulate has a content of from 2 to 40% by weight of cellulose fibers. This special granulate is then coated in a specific manner. The coating has a high content, preferably from about 60 to 65% by weight, of an inorganic filler, for example kaolin, magnesium silicate or calcium carbonate. As follows from the examples of WO 92/12645, it is not possible to apply the coating in a single step. Rather, a high-melting fat or wax and the filler must be applied to the T-granulate alternately in a plurality of steps. The disadvantages of this solution proposed in this prior art for improving the pelleting stability are evident. Firstly, a very special support material is absolutely necessary, secondly complex multistage coating of the support material is necessary.

Fat- or wax-coated granules have additional disadvantages. Despite release agents, these products have a tendency to stick together during storage. Owing to the hydrophobicity of the coating, the granules dissolve much more poorly. It has been found that as a result of these special types of coating, the bioavailability of the granulate constituents is decreased.

It is an object of the present invention, therefore, to provide novel pelleting-stable feedstuff additives that do not have the abovementioned disadvantages, and to provide processes for their production.

We have found that this object is achieved according to the invention by coating an enzyme-containing crude granulate with a filler-free organic polymer; pelleting-stable feed additives can also be prepared independently of the T-granulate support known from the prior art. Surprisingly, it has also been found that the polymer-coated feed additives of the invention have an excellent pelleting stability, offer an effective protection against enzyme exposure, and significantly improve the storage stability of the feed additives and in particular the stability in mineral feed and mineral premix.

DETAILED DESCRIPTION OF THE INVENTION

Figure 1:
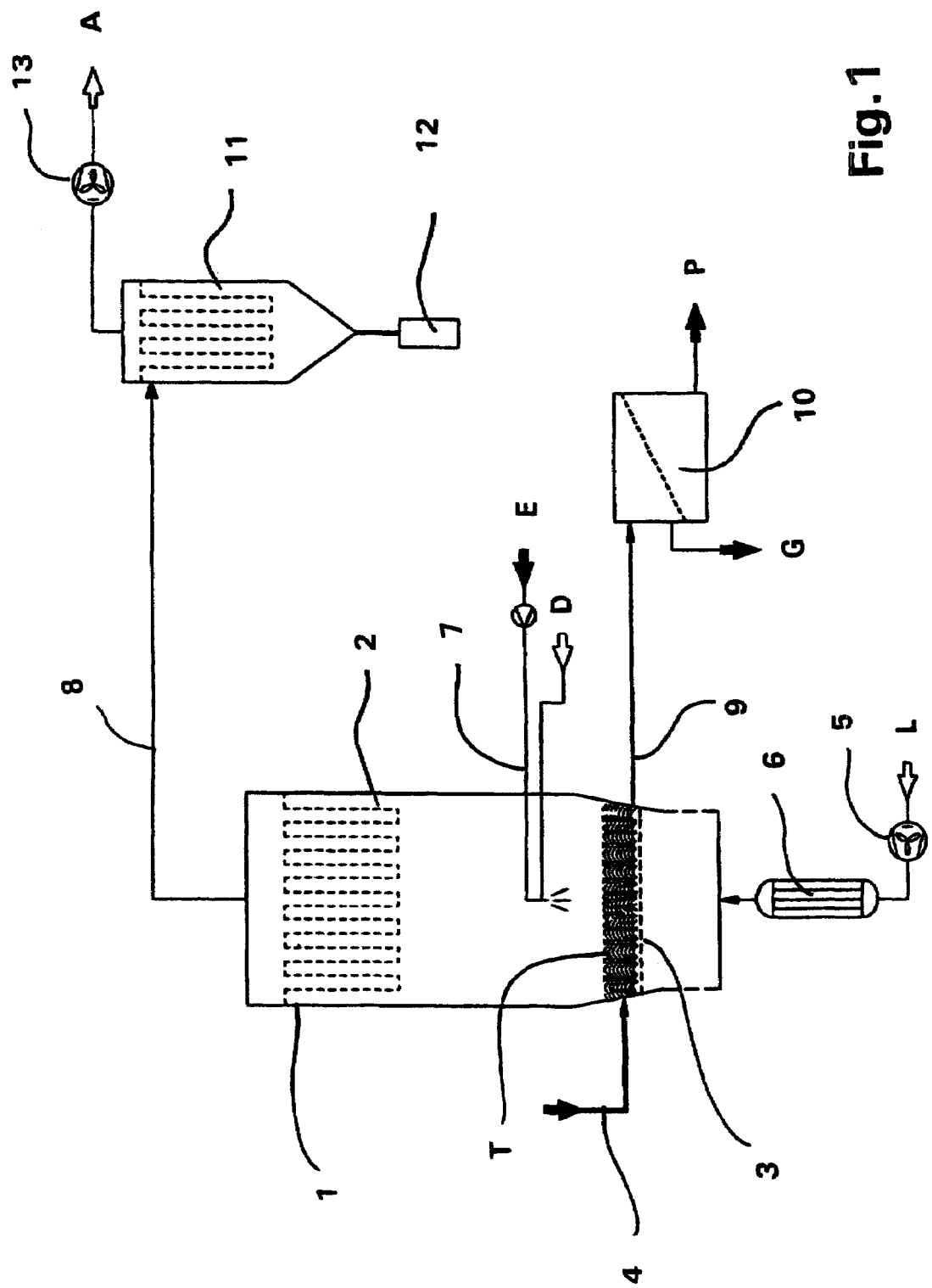
FIG. 1 shows schematically a fluidized-bed drier system for the batchwise production of a polymer-coated granulate.

The invention firstly relates to a process for producing a polymer-coated, granulated enzyme-containing feed additive, which comprises (1) processing a mixture comprising a support suitable for feedstuffs and at least one enzyme to form a crude granulate; and
(2) coating the crude granulate, preferably after drying, for example to a residual moisture of less than about 10% by weight, with an organic polymer which is suitable for feedstuffs, by
   (2a) spraying the crude granulate in a fluidized bed with a melt, a solution or a dispersion of the organic polymer or carrying out in a fluidized bed a powder coating with the organic polymer; or
   (2b) coating the crude granulate in a mixer by melting on the organic polymer, or spraying the crude granulate with a melt, a solution or a dispersion of the organic polymer or carrying out a powder coating with the organic polymer;
and if necessary post-drying, cooling and/or freeing from coarse fractions the respective resultant polymer-coated granulate.

The crude granulate can be produced in the most varied ways. For example, a mixture comprising the support suitable for feedstuffs and a solution of at least one enzyme can be processed to form a crude granulate in a manner known per se by extrusion, mixer-granulation, fluidized-bed-granulation, disk agglomeration or compaction. Preferably, it is produced by mixer-granulation or extrusion. In particular, extrusion ensures a homogeneous grain size, that is to say a narrow granulate particle size distribution. Finally, the crude granulate is preferably dried.

In addition, depending on the extrusion process, it can be necessary to spheronize the still-moist crude granulate before carrying out the drying and polymer coating, which reduces in particular the formation of unwanted dust fractions.

Preferably, the crude granulate is produced in the extruder, if appropriate followed by a spheronizing step. A granulation process of this type essentially comprises the following steps:

1) Slurrying the mass to be granulated

2) Extrusion

3) Spheronizing (optional)

4) Drying

Slurrying is performed in a mixer or kneader. For this purpose the solids (for example corn starch support) are mixed intensively with the liquid phases (for example enzyme solution). It is important for the later extrusion step to set the correct consistency; this is done by varying the amount of liquid. Since the mixture must generally be set to a defined enzyme activity, the amount of enzyme solution cannot be varied freely. The consistency is therefore set by adding water or an aqueous solution which may contain a binder.

The extrusion is performed in an apparatus in which the mass to be granulated is forced through a matrix. The hole diameter of the matrix determines the particle diameter and is from 0.5 to 2 mm. The shaped extrudates pass into the subsequent spheronizer. At the correct consistency of the mass to be granulated, there is only a small temperature increase on passing through the matrix (up to approximately 20° C.). If the mass is too dry, the temperature increase and the pressure buildup can be much higher, which can lead to partial loss of enzyme activity.

Suitable extruders are termed, for example, dome extruders or basket extruders, and are marketed, inter alia, from companies such as Fitzpatrick or Bepex.

The spheronizer essentially consists of a horizontally rotating disk on which the extrudates are forced onto the wall by the centrifugal force. The extrudates break at the micronotches which are predetermined by the extrusion process, so that cylindrical particles having a ratio of diameter to length of from about 1:1.3 to 1:3 are formed. Owing to the stress in the spheronizer, the initially cylindrical particles become somewhat rounded.

Finally, the particles are dried. This is preferably carried out in a fluidized-bed drier, in which heated air is passed from the bottom through the product layer. The air flow rate is therefore set in such a manner that the particles are fluidized. The water is evaporated by the heat transfer between air and particles. Since enzyme-containing products are very temperature-sensitive, care must be taken to ensure that the product temperature does not increase too high, that is to say generally not above 50° C., preferably not above from 40 to 45° C. Drying can be carried out continuously or batchwise.

After the drying, the granulate can be further fractionated (optional) using a screen. Coarse and fine material can be ground and recycled to the mixer for slurrying the granulation mass.

Granulation and/or polymer coating can be carried out continuously or batchwise within the process of the invention. Granulation and polymer-coating can also be carried out as separate process steps or coupled to one another.

According to a first preferred embodiment of the process of the invention, the crude granulate is charged into a fluidized bed, fluidized and coated with an aqueous or nonaqueous, preferably aqueous, solution or dispersion of the organic polymer by spraying. For this purpose a liquid which is as highly concentrated as possible and still sprayable is used, for example a from 10 to 50% strength by weight aqueous or nonaqueous solution or dispersion of at least one polymer which is selected from the group consisting of a) polyalkylene glycols, in particular polyethylene glycols having a number average molecular weight of from about 400 to 15,000, for example from about 400 to 10,000;

b) polyalkylene oxide polymers or copolymers having a number average molecular weight of from about 4000 to 20,000, for example from about 7700 to 14,600; in particular block copolymers of polyoxyethylene and polyoxypropylene;

c) polyvinylpyrrolidone having a number average molecular weight from about 7000 to 1,000,000, for example from about 44,000 to 54,000;

d) vinylpyrrolidone/vinylacetate copolymers having a number average molecular weight from about 30,000 to 100,000, for example from about 45,000 to 70,000;

e) polyvinyl alcohol having a number average molecular weight from about 10,000 to 200,000, for example from about 20,000 to 100,000; and f) hydroxypropyl methyl cellulose having a number average molecular weight from about 6000 to 80,000, for example from about 12,000 to 65,000.

According to a further preferred process variant, for the coating a from 10 to 40% strength by weight, preferably from about 20 to 35% strength by weight, sprayable aqueous or nonaqueous solution or dispersion of at least one polymer which is selected from the group consisting of:

g) alkyl (meth)acrylate polymers and copolymers having a number average molecular weight from about 100,000 to 1,000,000; in particular ethyl acrylate/methyl methacrylate copolymers and methyl acrylate/ethyl acrylate copolymers; and h) polyvinyl acetate having a number average molecular weight from about 250,000 to 700,000, possibly stabilized with polyvinylpyrrolidone is used.

Generally, preference is given to aqueous solutions or aqueous dispersions for the following reasons: No special measures are necessary for working up or recovering the solvents; no special measures are required for explosion protection; some coating materials are preferentially offered as aqueous solutions or dispersions.

However, in special cases, the use of a nonaqueous solution or dispersion can also be advantageous. The coating material dissolves very readily or an advantageously high proportion of the coating material can be dispersed. In this manner a spray liquid having a high solids content can be sprayed, which leads to shorter process times. The lower enthalpy of evaporation of the nonaqueous solvent also leads to shorter process times.

Dispersions which can be used according to the invention are obtained by dispersing above polymers in an aqueous or nonaqueous, preferably aqueous, liquid phase, with or without a customary dispersant. A polymer solution or dispersion is preferably sprayed in such a manner that the crude granulate is charged into a fluidized-bed apparatus or a mixer and the spray material is sprayed on with simultaneous heating of the charge. The energy is supplied in the fluidized-bed apparatus by contact with heated drying gas, frequently air, and in the mixer by contact with the heated wall and, if appropriate, with heated mixing tools. It may be expedient to preheat the solution or dispersion if as a result spray material can be sprayed with a high dry matter content. When organic liquid phases are used, solvent recovery is expedient. The product temperature during the coating should be in the range of from about 35 to 50° C. The coating can be carried out in the fluidized-bed apparatus in principle in the bottom-spray process (nozzle is in the gas-distributor plate and sprays upwards) or in the top-spray process (coating is sprayed from the top into the fluidized bed).

Examples of suitable polyalkylene glycols a) are: polypropylene glycols, and in particular polyethylene glycols of varying molar mass, for example PEG 4000 or PEG 6000, obtainable from BASF AG under the tradenames Lutrol E 4000 and Lutrol E 6000.

Examples of above polymers b) are: polyethylene oxides and polypropylene oxides, ethylene oxides/propylene oxide mixed polymers and block copolymers made up of polyethylene oxide and polypropylene oxide blocks, for example polymers which are obtainable from BASF AG under the tradenames Lutrol F 68 and Lutrol F127.

Of the polymers a) and b), preferably, highly concentrated solutions of from up to about 50% by weight, for example from about 30 to 50% by weight, based on the total weight of the solution, can advantageously be used.

Examples of above polymers c) are: polyvinylpyrrolidones, as are marketed, for example, by BASF AG under the tradenames Kollidon or Luviskol. Of these polymers, highly concentrated solutions having a solids content of from about 30 to 40% by weight, based on the total weight of the solution, can advantageously be used.

An example of abovementioned polymers d) is a vinylpyrrolidone/vinyl acetate copolymer which is marketed by BASF AG under the tradename Kollidon VA64. Highly concentrated solutions of from about 30 to 40% by weight, based on the total weight of the solution, of these copolymers can particularly advantageously be used.

Examples of above polymers e) are: products such as are marketed, for example, by Hoechst under the tradename Mowiol. Solutions of these polymers having a solids content in the range from about 8 to 20% by weight can advantageously be used.

Examples of suitable polymers f) are: hydroxypropylmethyl-celluloses, for example as marketed by Shin Etsu under the tradename Pharmacoat.

Examples of abovementioned polymers g) are: alkyl (meth)acrylate polymers and copolymers whose alkyl group has from 1 to 4 carbon atoms. Specific examples of suitable copolymers are: ethyl acrylate/methyl methacrylate copolymers, which are marketed, for example, under the tradenames Kollicoat EMM 30D by BASF AG or under the tradenames Eutragit NE 30 D by Rohm; also methacrylate/ethyl acrylate copolymers, as are marketed, for example, under the tradenames Kollicoat MAE 30DP by BASF AG or under the tradenames Eutragit 30/55 by Rohm. Copolymers of this type can be processed according to the invention, for example, as from 10 to 40% strength by weight dispersions.

Examples of above polymers h) are: polyvinyl acetate dispersions which are stabilized with polyvinylpyrrolidone and are marketed, for example, under the tradename Kollicoat SR 30D by BASF AG (solids content of the dispersion from about 20 to 30% by weight).

According to a second preferred embodiment of the process of the invention, the crude granulate is charged into a fluidized bed and powder-coated. The powder-coating is preferably carried out using a powder of a solid polymer which is selected from the group consisting of hydroxypropyl methyl celluloses (HPMC) having a number average molecular weight of from about 6000 to 80,000; in a mixture with a plasticizer. Suitable materials for a powder coating are also all other coating materials which can be present in the pulverulent form and can be applied neither as a melt nor as highly concentrated solution (for example the case with HPMC).

The powder coating is preferably carried out in such a manner that the coating material is continuously added to the crude granulate charged into the fluidized bed. The fine particles of the coating material (particle size in the range of from about 10 to 100 μm) lie on the relatively rough surface of the crude granulate. By spraying in a plasticizer solution, the coating material particles are stuck together. Examples of suitable plasticizers are polyethylene glycol solutions, triethyl citrate, sorbitol solutions, paraffin oil and the like. To remove the solvent, the coating is performed with slight heating. The product temperature in this case is below about 60° C., for example from about 40 to 50° C.

In principle, the powder coating can also be carried out in a mixer. In this case, the powder mixture is added and the plasticizer is also injected via a nozzle. Drying is performed by supplying energy via the wall of the mixer and if appropriate via the mixing tools. Here also, as in the coating and drying in the fluidized bed, low product temperatures must be maintained.

According to a third preferred embodiment of the process of the invention, the crude granulate is charged into a fluidized bed or mixer is coated using a melt of at least one polymer which is selected from the group consisting of
a) polyalkylene glycols, in particular polyethylene glycols, having a number average molecular weight of from about 1000 to 15,000; and
b) polyalkylene oxide polymers or copolymers having a number average molecular weight of from about 4000 to 20,000, in particular block copolymers of polyoxyethylene and polyoxypropylene.

The melt coating is carried out in a fluidized bed preferably in such a manner that the granulate to be coated is charged into the fluidized-bed apparatus. The coating material is melted in an external reservoir and pumped to the spray nozzle, for example, via a heatable line. Heating the nozzle gas is expedient. Spraying rate and melt inlet temperature must be set in such a manner that the coating material still runs readily on the surface of the granulate and coats this evenly. It is possible to preheat the granulate before the melts are sprayed. In the case of coating materials having a high melting point, attention must be paid to the fact that the product temperature must not be set too high in order to minimize loss of enzyme activity. The product temperature should be in the range of from about 35 to 50° C. The melt coating can also be carried out in principle by the bottom-spray process or by the top-spray process. The melt coating can be carried out in a mixer in two different ways. Either the granulate to be coated is charged into a suitable mixer and a melt of the coating material is sprayed into the mixer, or, in another possibility, the coating material in solid form is to be mixed with the product. By supplying energy via the vessel wall or via the mixing tools, the coating material is melted and thus coats the crude granulate. If required, some release agent can be added from time to time. Suitable release agents are, for example, salicic acid, talcum, stearates and tricalcium phosphate.

The polymer solution, polymer dispersion or polymer melt used for the coating may receive other additions, for example of microcrystalline cellulose, talcum or kaolin.

The invention further relates to granulated, polymer-coated feed additives, comprising a solid granulated mixture consisting of a support suitable for feedstuffs and at least one enzyme, coated with an organic polymer suitable for feedstuffs, selected from the abovedescribed polymers a) to g).

The feed additives according to the invention preferably have a maximum particle size of from about 0.4 to 2 mm, in particular from about 0.5 to 1 mm.

The content by weight of the polymer coating in the total weight of the feedstuff additive to be coated is in the range from about 3 to 25% by weight, preferably from 5 to 20% by weight, based on the total weight of the finished feedstuff additive. The residual moisture content of the polymer-coated feedstuff additive is determined primarily by the hygroscopicity of the polymer material. Generally, the residual moisture content is in the range from about 1 to 10% by weight, for example from 1 to 5% by weight, based on the total weight of the coated granules.

The enzyme content of the total weight of the coated granulate is from about 5 to 30% by weight.

The feedstuff additives of the invention comprise at least one enzyme which is selected from the group consisting of oxidoreductases, transferases, lyases, isomerases, ligases and hydrolases.

Examples of hydrolases, that is to say enzymes which cause a hydrolytic cleavage of chemical bonds, are esterases, glycosidases, etherhydrolases, proteases, amidases, aminidases, nitrilases and phosphatases. Glycosidases comprise both endo- and exo-glucosidases, which cleave both α- and β-glycosidic bonds. Typical examples of these are amylases, maltases, cellulases, endoxylanases, β-glucanases, mannanases, lysozymes, galactosidases, β-glucuronidases and the like. Preference is given in particular to enzymes cleaving non-starch polysaccharide, for example amylase, glucanase and xylanase, and phosphatases, such as in particular phytase. Particularly preferred feedstuff additives comprise from $1 \times 10^4$ to $1 \times 10^5$ U of phytase per gram of total weight of the feedstuff additive. 1 U of phytase is defined here as the release of 1 micromol of inorganic phosphate per minute from an excess of phytate.

The support materials which are suitable for feedstuffs that can be used are conventional inert supports. An "inert" support must not demonstrate any adverse interactions with the enzyme(s) of the feed additive of the invention, for example an irreversible inhibition of the enzyme activity, and must be safe for use as an auxiliary in feed additives. Examples of suitable support materials are: low-molecular-weight inorganic or organic compounds and higher-molecular-weight organic compounds of natural or synthetic origin. Examples of suitable low-molecular-weight inorganic supports are salts, such as sodium chloride, calcium carbonate, sodium sulfate and magnesium sulfate. Examples of suitable organic supports are, in particular, sugars, for example glucose, fructose, sucrose and dextrins and starch products. Examples of higher-molecular-weight organic supports are: starch preparations and cellulose preparations, such as in particular corn starch, or cereal flours, for example wheat flour, rye flour, barley flour and oat flour or mixtures thereof. The support material is present in the polymer-coated granulate, on a dry weight basis, at from about 10 to 85% by weight, preferably from about 50 to 85% by weight.

In addition to enzyme and support material, other additives can be present in the granulate, for example enzyme-stabilizing inorganic salts having divalent cations, for example zinc sulfate, magnesium sulfate and calcium sulfate, at a content of from about 0.5 to 10% by weight, preferably from about 0.5 to 5% by weight. In addition, other nutritionally relevant additives, for example vitamins (for example vitamin A, $B_1$, $B_2$, $B_6$, $B_{12}$, $D_3$, E, $K_3$ and the like) or trace elements (for example manganese, iron, copper, zinc, iodine, selenium in the form of suitable salts) can be present in the granulate. The total amount of such additives can be, for example, in the range from 1 to 10% by weight, based on the dry weight of the coated granulate.

If the adhesive properties of the enzyme used should not be sufficient to produce a mechanically stable crude granulate, the use of binders as additional granulation aids may be advantageous. Examples of suitable binders are: solutions of carbohydrates, for example glucose, sucrose, dextrins and the like, sugar alcohols, for example mannitol, or polymer solutions, for example solutions of hydroxypropylmethylcellulose (HPMC), polyvinylpyrrolidone (PVP), ethoxylated cellulose (EC), ethylcellulose or propylcellulose. The binder content, based on the dry weight of the coated granulate, is, for example, in the range from about 0 to 20% by weight, for example from 1 to 6% by weight, depending on the type and adhesive properties of the binder used.

The invention further relates to pelleted feedstuff compositions which, in addition to customary constituents, comprise as admixture at least one feedstuff additive in accordance with the above definition.

Finally, the invention also relates to the use of a feedstuff additive in accordance with the above definition for producing pelleted feedstuff compositions.

To produce the pelleted feedstuff compositions, the coated enzyme granules produced according to the invention are mixed with customary animal feed (for example pig fattening feed). The enzyme granulate content is selected so that the enzyme content is for example, in the range from 10 to 1000 ppm. Finally, the feed is pelleted using a suitable pellet press. For this purpose the feed mixture is customarily conditioned by steam introduction and then pressed through a matrix. Depending on the matrix, pellets from about 2 to 12 mm in diameter can be produced in this manner. The highest process temperature here occurs during pressing the mixture through the matrix. Here, temperatures in the range from about 60 to 100° C. can be reached.

The present invention is now described in more detail on the basis of the following non-limiting examples and the accompanying figures.

FIG. 1 shows diagrammatically a fluidized-bed drier system for the batchwise production of a polymer-coated granulate. In a fluidized-bed drier 1, provided with an internal filter 2 and a perforated plate 3, air L is introduced from the bottom using the fan 5, which air was preheated by the heater 6. Via the product feed 4, a filling of spheronized dried crude granulate T is charged into the fluidized-bed drier 1 at the start of the process and is fluidized by the preheated air. Onto the fluidized bed thus formed, polymer solution E is sprayed into the fluidized-bed drier above the fluidized bed via the spray apparatus 7 using compressed air D. As soon as the desired amount has been sprayed in, the feed of polymer solution E is interrupted, the crude product if necessary is post-dried in the fluidized bed and passed via the product discharge 9 from the fluidized-bed drier 1 into the screen apparatus 10, where it is separated into coarse material G and product P having the desired particle size. The process exhaust air A, after passage through the internal filter 2 is passed through the outlet line 8 to the exhaust air filter 11, freed there from very fine particles which are collected in the vessel 12, and is removed from the plant via the fan 13.

Figure 2:
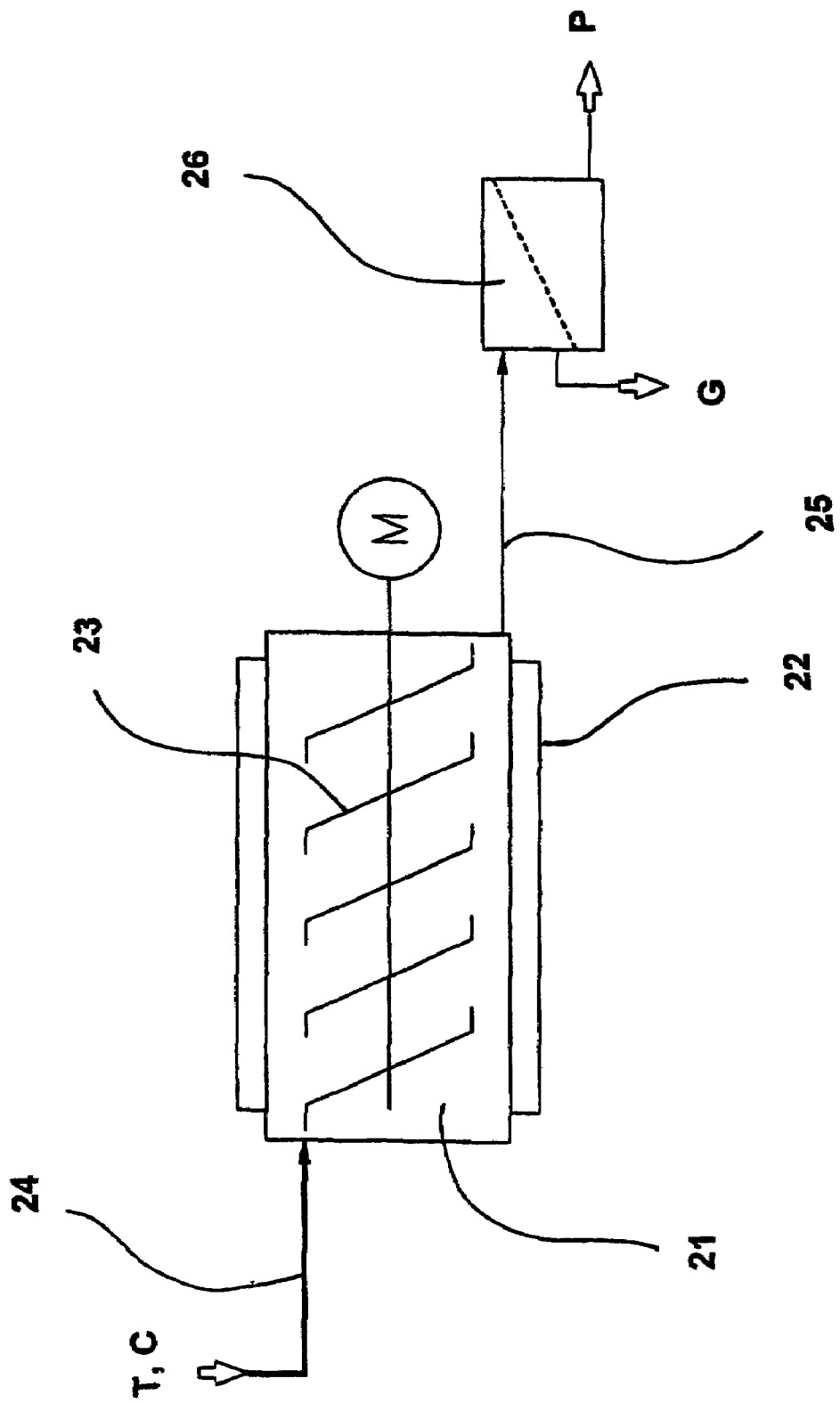
FIG. 2 shows schematically a batchwise mixing apparatus for producing polymer-coated granules.

FIG. 2 shows diagrammatically a batchwise mixing apparatus for producing polymer-coated granules. Crude granulate T and solid coating material C are introduced simultaneously or staggered in time via the product feed 24 into a mixer 21 which is provided with a heating jacket 22 and an agitator 23 driven via the motor M. Using the heating jacket 22, the mixer is heated until the coating material melts and a uniform coating forms on the granulate. After development of the polymer coating, by decreasing the heat output, the temperature in the mixer is lowered until the polymer coating solidifies. The crude product is then passed via the product discharge 25 to the screen 26, where it is separated into coarse material G and product P having the desired particle size.

EXAMPLE 1

Fluidized-Bed Coating with Aqueous Polyvinyl Alcohol Solution

The product to be coated is a phytase-containing granulate having a residual moisture content of from 6 to 7% and an activity of approximately 6500 U/g. The granules had a particle size of at most 850 μm and a mean particle size of 550 μm (sieve analysis).

The coating material used was polyvinyl alcohol (PVA) from Hoechst (lot no. 601 B4 1153; tradename Mowiol 8/88) having a residual moisture content of <1%. To carry out the experiment a laboratory fluidized bed Aeromat type MP-1 from Niro-Aeromatic was used. The reservoir vessel used was a plastic cone having a gas distributor plate diameter of 170 mm and a perforated plate having 12% free surface area.

The enzyme granulate (700 g) charged into the fluidized bed was heated to 45° C. product temperature with fluidizing at a feed air temperature of from 45 to 55° C. and feed air flow rate of 50 m$^3$/h. The polyvinyl alcohol (78 g) was dissolved in deionized water (702 g) in a glass beaker at room temperature with stirring. Since, as a solution, sprayed polyvinyl alcohol has strong adhesive properties, talcum was slurried in (15.6 g equivalent to 20%, based on PVA) to decrease this property. The resultant talcum dispersion was stirred on a magnetic stirrer for 30 min to homogenize it and distribute the talcum as finely as possible and to prevent blockage of the nozzle. The dispersion was heated to 35° C. for spraying in order to reduce the viscosity, as a result of which it was possible to produce a finer spray film. Because of the strong film formation, the spraying rate was set to only 1-2 g/min. The dispersion was transported by a diaphragm pump and sprayed onto the enzyme granulate using a two-component nozzle (1.2 mm) at 1.5-2 bar spray pressure in the top-spray process. During the spraying, the feed air flow rate was increased stepwise to 140 m$^3$/h in order to maintain fluidization. The water of the coating solution was evaporated by the heated feed air and the polyvinyl alcohol was deposited as a protective coating around the granulate particles. The spraying period was 540 min, with the product temperature being 45° C. and the feed air temperature from 45 to 52° C. The product was then dried for 25 min at 45° C. product temperature, during which the feed air flow rate was again lowered to 100 m$^3$/h in order to keep the abrasion of the coating as low as possible. The product was cooled to a product temperature of 30° C. with fluidization.

A product having the following physicochemical characteristics was obtained:

| | |
|---|---|
| Residual moisture content: | 4% |
| Phytase activity: | approximately 6000 U/g |
| Appearance (microscope): | particles having a relatively rough surface, continuous coating. |

EXAMPLE 2

Fluidized-Bed Coating with an Aqueous Polyethylene Glycol 6000 Solution

The product to be coated was a phytase-containing granulate having a residual moisture content of from 6 to 7% and an activity of approximately 6500 U/g. The granules had a particle size of a maximum of 850 μm and a mean particle size of 570 μm (sieve analysis).

The coating material used was polyethylene glycol 6000 from SERVA (Lot. 09515, residual moisture content <1%). To carry out the experiment a laboratory fluidized bed Aeromat type MP-1 from Niro-Aeromatic was used. The reservoir vessel used was a plastic cone having a gas distributor plate diameter of 110 mm and a perforated plate having 12% free surface area.

The enzyme granulate (700 g) charged into the fluidized bed was heated to 40° C. product temperature with fluidization at a feed air temperature of 60° C. and feed air flow rate of 30 m$^3$/h. The polyethylene glycol (78.3 g) was dissolved in deionized water (77.7 g) in a glass beaker at room temperature with stirring and sprayed onto the enzyme granulate by a two-component nozzle (1 mm) at 1.5 bar spray pressure in the top spray process. During the spraying, the feed air flow rate was increased stepwise to 50 m$^3$/h in order to maintain the fluidization. The heated feed air evaporates the water of the coating solution and the polyethylene glycol was deposited as protective coating around the granulate particles. The spraying time was 14 min, during which the product temperature was kept at 40° C. and the feed air temperature was approximately 60° C. The product was then dried for 60 min at 40° C. product temperature, during which the feed air flow rate was again lowered stepwise to 40 m$^3$/h in order to keep abrasion of the coating as low as possible. The product was cooled to 30° C. product temperature with fluidization.

A product having the following physicochemical characteristics was obtained:

| | |
|---|---|
| Residual moisture: | 4 to 5% |
| Phytase activity: | approximately 6000 U/g |
| Appearance (microscope): | Particles having a relatively smooth surface, continuous coating. |

EXAMPLE 3

Fluidized-Bed Coating with a Polyethylene Glycol 6000 Melt

The product to be coated was a phytase-containing granulate having a residual moisture content of from 6 to 7% and an activity of approximately 6500 U/g. The granules had a particle size of maximum of 850 μm and a mean particle size of 600 μl (sieve analysis).

The coating material used was polyethylene glycol 6000 from SERVA (Lot. 09515, residual moisture content <1%). To carry out the experiment a laboratory fluidized bed Aeromat type MP-1 from Niro-Aeromatic was used. The reservoir vessel used was a plastic cone having a gas distributor plate diameter of 110 mm and a perforated plate having 12% free surface area.

The enzyme granulate (700 g) charged into the fluidized bed was heated to 40° C. product temperature with fluidization at an air flow rate of 30 m$^3$/h. The polyethylene glycol (78.3 g) was melted in a glass beaker in an oil bath at 120° C. and sprayed onto the enzyme granulate in the top-spray process using a two-component nozzle (1 mm) with heated spray gas at from 80 to 95° C. at 2.5 bar spray pressure. During the spraying, the coating material and the intake line were heated to from 100 to 120° C. in order to obtain a fine spray mist, so that a uniform coating layer forms around the particles and encloses these continuously. The spraying time was 12 min, during which the product temperature was kept at 40° C. and the feed air was from 35 to 40° C. The product was then dried to 30° C. in 50 min with fluidization at 30 m$^3$/h feed air.

A product having the following physicochemical characteristics was obtained:

| | |
|---|---|
| Residual moisture: | 4% |
| Phytase activity: | approximately 6000 U/g |
| Appearance (microscope): | Particles having a smooth surface. |

EXAMPLE 4

Fluidized-Bed Coating with a Melt of a Polyoxyethylene-Polyoxypropylene Block Polymer The product to be coated was a phytase-containing granulate having a residual moisture content of from 6 to 7% and an activity of approximately 6500 U/g. The granules had a particle size of a maximum of 850 µm and a mean particle size of 600 µm (sieve analysis).

The coating material used was Lutrol F68 (polyoxyethylene-polyoxypropylene block polymer, BASF lot. 70-0243, having a residual moisture content of <1%). To carry out the experiment a fluidized bed type GPCG5 having a vessel volume of 20 l was used together with a two-component nozzle (1.5 mm) and as an insert a plate type PZ 100 µm was used.

The enzyme granulate (5 kg) charged into the fluidized bed was heated to 43° C. product temperature with fluidization at an air flow rate of 30 m³/h. The Lutrol F68 (1 kg) was sprayed onto the enzyme granulate as a melt (120° C.) with heated spray gas of 100° C. and 3 bar. During the spraying process, the air flow rate was increased to 50 m³/h in order to maintain the fluidized bed height. The spraying time was 64 min, during which the product temperature was from 43 to 48° C. and the feed air temperature from 44 to 45° C. The product was then cooled to 26° C. with fluidization at 45 m³/h of feed air.

A product having the following physicochemical characteristics was obtained:

| | |
|---|---|
| Residual moisture: | 5-7% |
| Phytase activity: | approximately 5400 U/g |
| Appearance (microscope): | Particles having smooth, droplet-like surface |

COMPARATIVE EXAMPLE 1

Fluidized-Bed Coating with a Fat Melt

The product to be coated was a phytase-containing granulate having a residual moisture content of from 6 to 7% and an activity of approximately 6500 U/g. The granules had a particle size of a maximum of 850 µm and a mean particle size of 700 µm (sieve analysis).

The coating material used was fat (hardened beef tallow from Henkel, EDENOR NHTI-G CAS NO. 67701-27-3, having a residual moisture content of <1%). To carry out the experiment a laboratory fluidized bed Aeromat type MP-1 from Niro-Aeromatic was used. The reservoir vessel used was a metal cone having a gas distributor plate diameter of 110 mm and a perforated plate having 12% free surface area.

The enzyme granulate (750 g) charged into the fluidized bed was heated to 45° C. product temperature with fluidization at an air flow rate of 50 m³/h. The fat (321 g) was melted in a glass beaker in an oil bath at 100° C. and was sprayed onto the enzyme granulate at 3 bar spray pressure using heated spray gas at 85-90° C. using a 1 mm two-component nozzle in the top-spray process by reduced-pressure intake via a heated line. During the spraying, the coating material and the intake line were heated to from 100 to 120° C. in order to obtain a fine spray mist, so that a uniform coating layer forms around the particles and these are enclosed continuously. During the spray process, the air flow rate was increased to 60 m³/h to maintain the fluidized bed height. The spray time was 15 min, during which the product temperature was from 45 to 48° C. and the feed air temperature approximately 45° C. The product was then cooled to 30° C. with fluidization at 50 m³/h feed air.

A product having the following physicochemical characteristics was obtained:

| | |
|---|---|
| Residual moisture: | 6-8% |
| Phytase activity: | approximately 5500 U/g |
| Appearance (microscope): | Particles having a smooth surface, continuous coating. |

EXAMPLE 5

Fluidized-Bed Coating with an Aqueous Dispersion of Polyvinyl Acetate

The product to be coated was a phytase-containing granulate having a residual moisture content of from 6 to 7% and an activity of approximately 6500 U/g. The granules had a particle size of a maximum of 850 µm and a mean particle size of 570 µm (sieve analysis).

The coating material used was a polyvinyl acetate dispersion, stabilized with polyvinylpyrrolidone (Kollicoat SR 30D, BASF product no. 201076, Lot. 18-0847 having a solids content of 30%). The coating additive used was microcrystalline cellulose AVICEL PH 105 Lot. 00587 from SERVA. To carry out the experiment a laboratory fluidized bed Aeromat type MP-1 from Niro-Aeromatic was used. The reservoir vessel used was a plastic cone having a gas distributor plate diameter of 170 mm and a perforated plate having 16% free surface area.

The enzyme granulate (700 g) charged into the fluidized bed was fluidized at room temperature and a feed air flow rate of 35 m³/h. A dispersion of AVICEL PH 105 (97.9 g) and deionized water (310 g) was prepared in a glass beaker with stirring for 30 minutes at room temperature and this was stirred into the Kollicoat dispersion (467 g). This dispersion mixture was sprayed onto the enzyme granulate by a two-component nozzle (1.2 mm) at a feed air temperature of 35° C., feed air flow rate of 45 m³/h, at 1.5 bar, by transport by a diaphragm pump. The product temperature during the spraying was from 17 to 20° C. The dispersion was sprayed onto the enzyme granulate in the top-spray process. During this the water of the coating solution evaporates and the Kollicoat particles enclose the granulate particles and stick together on their surface (coating). In order to decrease the strong adhesive properties (film formation) of Kollicoat, microcrystalline cellulose was added. During the spraying, the feed air flow rate was increased stepwise to 65 m³/h in order to maintain the fluidization. The spray time was 43 min. The product was then dried for 80 min at from 20 to 26° C. product temperature, during which the feed air flow rate was lowered to 55 m³/h in order to keep abrasion of the coating as low as possible.

A product having the following physicochemical characteristics was obtained:

| | |
|---|---|
| Residual moisture: | 7% |
| Phytase activity: | approximately 4700 U/g |
| Appearance (microscope): | Particles having a smooth surface, continuous coating. |

EXAMPLE 6

Mixer Coating with a Polyethylene Glycol 6000 Melt

The product to be coated was a phytase-containing granulate having a residual moisture content of from 6 to 7% and an activity of approximately 6500 U/g. The granules had a particle size of a maximum of 850 µm and a mean particle size of approximately 600 µm (sieve analysis). The coating material used was polyethylene glycol 6000 from SERVA (Lot. 09515 having a residual moisture content of <1%). To carry out the experiment a Lödige mixer type M 5 R with ploughshares and 5 l capacity was used.

The enzyme granulate (700 g) charged into the mixer was heated to 56° C. with mixing at 170 rpm. A portion of the polyethylene glycol melt at 100° C. was then added until the product began to stick together. By cooling via the vessel wall, the product temperature was kept at from 50 to 54° C. until the mass was homogeneous. From 50° C. the agglomerates disaggregated again and the remaining melt (total amount 233 g) was added. With slow cooling of the product, the polyethylene glycol solidified and completely surrounded the particles. The coated product was post-mixed at from 48 to 46° C. for 5 minutes at 220 rpm and then cooled to 36° C. at the same stirrer speed.

A product having the following physicochemical characteristics was obtained:

| | |
|---|---|
| Residual moisture: | from 2 to 3% |
| Phytase activity: | approximately 5000 U/g |
| Appearance (microscope): | Particles having a smooth surface |

COMPARATIVE EXAMPLE 2

Mixer Coating with a Fat Melt

The product to be coated was a phytase-containing granulate having a residual moisture content of from 6 to 8% and an activity of approximately 6500 U/g. The granules had a particle size of a maximum of B50 µm and a mean particle size of 600 µm (sieve analysis).

The coating material used was fat (hardened beef tallow from Henkel, EDENOR ETI-G CAS-NO. 67701-03-5 having a residual moisture content of <1%). To carry out the experiment a Lödige mixer Type M 5 R with ploughshares and a capacity of 5 l was used.

The enzyme granulate (700 g) charged into the mixer was heated with the fat (175 g) to 55° C. with mixing at 170 rpm. The fat began to melt at 51° C. and was deposited as a film around the granules. From 55° C. the product began to stick together. By cooling via the vessel wall, the product temperature was slowly reduced, during which the fat solidified again and enclosed the particles with a protective coat. On solidification of the fat, the speed was increased to 220 rpm so that the aggregates broke down before the product had reached a temperature of 36° C.

A product having the following physicochemical characteristics was obtained:

| | |
|---|---|
| Residual moisture: | from 6 to 8% |
| Phytase activity: | approximately 6200 U/g |
| Appearance (microscope): | Particles having a very smooth enclosed surface. |

EXPERIMENT 1

Determination of Pelleting Stability

To assess the stability of the feedstuff enzymes during pelleting, a standard pelleting was established. For this purpose, to improve the analytical content determinations, the dosage in the feed is increased. The pelleting is operated in such a manner that a pellet temperature of from 80 to 85° C. is always reached. The enzyme activity in the pelleted feed is determined in comparison with the initial activity. If necessary after correcting for the enzyme content naturally present, the retention can be calculated. As a control, a "standard sample" is always taken through the pelleting process and analyzed in a similar manner.

The analytical method for phytase is described in various publications: Simple and Rapid Determination of Phytase Activity, Engelen et al., Journal of AOAC International, Vol. 77, No. 3, 1994; Phytase Activity, General Tests and Assays, Food Chemicals Codex (FCC), IV, 1996, p. 808-810; Bestimmung der Phytaseaktivität in Enzymstandardmaterialien und Enzympräparaten [Determination of phytase activity in standard enzyme materials and enzyme preparations] VDLUFA-Methodenbuch, [Handbook of VDLUFA methods], Volume III, 4$^{th}$ Supplement 1997; or Bestimmung der Phytaseaktivität in Futtermitteln und Vormischungen [Determination of phytase activity in feedstuffs and premixes] VDLUFA-Methodenbuch, [Handbook of VDLUFA methods], Volume III, 4$^{th}$ supplement 1997.

The feed used is always a "standard feed" having the composition below:

| | |
|---|---|
| Corn | 20.7% |
| Barley | 40.0% |
| Manioc | 10.0% |
| Oats | 13.0% |
| Soybean | 3.0% |
| Fish meal | 3.0% |
| Wheat semolina bran | 0.84% |
| Soybean oil | 0.5% |
| Lime | 1.2% |
| Salts | 0.2% |
| Trace elements | 0.06% |
| Methionine | 0.05% |
| Choline chloride (50%) | 0.05% |
| Ca propionate | 0.4% |
| | 100% |

The coated granules produced in the examples above were mixed with above standard feed (content 500 ppm), pelleted and analyzed for the relative improvement in retention of the enzyme activity. The results are summarized in Table 1 below.

TABLE 1

Pelleting stability achieved by coating—overview

| Ex. No. | Coating substance | Type | Coating content [%][1] | Pelleting temperature [° C.] | relative improvement in retention [%][2] |
|---|---|---|---|---|---|
| 1 | PVA | L | 9.5 | 85 | 19/66 |
| 2 | PEG 6000 | L | 10 | 84 | 15/71 |
| 3 | PEG 6000 | S | 10 | 84 | 15/74 |
| 4 | F68 | S | 16 | 85 | 23/73 |
| V1 | Fat | S | 30 | 80 | 24/74 |
| 5 | SR 30 D | D | 25 | 84 | 30/82 |

TABLE 1-continued

Pelleting stability achieved by coating—overview

| Ex. No. | Coating substance | Type | Coating content [%][1] | Pelleting temperature [° C.] | relative improvement in retention [%][2] |
|---|---|---|---|---|---|
| 6 | PEG 6000 | S | 25 | 80 | 26/67 |
| V2 | Fat | S | 20 | 80 | 25/79 |

L: Solution,
S: Melt,
D: Dispersion

[1]% by weight

[2]relative improvement in retention of enzyme activity after pelleting: [(Retention with coating—retention without coating): retention without coating] × 100/retention with coating Calculation example:

Retention with coating: 66%; Retention without coating: 55.5%.

Calculation: ((66−55.5): 55.5)×100=19;

Reported in Table 1: 19/66

We claim:

1. A method for preparing a pelletized feedstuff composition, which comprises pelletizing a mixture of animal feed constituents and a coated enzyme-containing granulate suitable for use in animal feed, wherein the enzyme-containing granulate comprises a mixture of at least one enzyme and a solid support suitable for feedstuffs, wherein the solid support is a low-molecular-weight inorganic or organic compound selected from inorganic salts or sugars, wherein the enzyme-containing granulate is coated with an organic polymer which is suitable for feedstuffs selected from the group consisting of:
   a) polyalkylene glycols having a number average molecular weight of from 400 to 15,000;
   b) polyalkylene oxide polymers or copolymers having a number average molecular weight of from 4000, to 20,000;
   c) polyvinylpyrrolidone having a number average molecular weight from 7000 to 1,000,000;
   d) vinylpyrrolidone/vinylacetate copolymers having a number average molecular weight from 30,000 to 100,000;
   e) polyvinyl alcohol having a number average molecular weight from 20,000 to 100,000;
   f) hydroxypropyl methyl cellulose having a number average molecular weight from 6,000 to 80,000;
   g) alkyl (meth)acrylate polymers and copolymers having a number average of molecular weight from 100,000 to 1,000,000; and
   h) polyvinyl acetate having a number average molecular weight from 250,000 to 700,000,
   to obtain a pelletized feedstuff composition, and wherein the coated enzyme-containing granulate has a pelleting stability greater than an uncoated enzyme-containing granulate.

2. The method of claim 1 wherein the granulate has a mean particle size from 0.4 to 2 mm.

3. The method of claim 1 wherein the enzyme-containing granulate comprises at least one enzyme selected from the group consisting of oxidoreductases, transferases, lyases, isomerases, ligases, phosphatases and hydrolases.

4. The method of claim 3 wherein the hydrolase is a non-starch-polysaccharide-cleaving enzyme.

5. The method of claim 3 wherein the phosphatase is phytase.

6. The method of claim 5 wherein the granulate comprises from $1\times10^3$ to $1\times10^5$ U of phytase per gram of total weight.

7. A pelleted feedstuff composition which comprises at least one enzyme-containing granulate suitable for use in animal feed, wherein said granulate comprises a mixture of at least one enzyme and a solid support suitable for feedstuffs, wherein the solid support is a low-molecular-weight inorganic or organic compound selected from inorganic salts or sugars, wherein the enzyme-containing granulate is coated with an organic polymer which is suitable for feedstuffs and selected from the group consisting of:
   a) polyalkylene glycols having a number average molecular weight from 400 to 15,000;
   b) polyalkylene oxide polymers or copolymers having a number average molecular weight from 4000 to 20,000;
   c) polyvinylpyrrolidone having a number average molecular weight from 7000 to 1,000,000;
   d) vinylpyrrolidone/vinylacetate copolymers having a number average molecular weight from 30,000 to 100,000;
   e) polyvinyl alcohol having a number average molecular weight from 20,000 to 100,000;
   f) hydroxypropyl methyl cellulose having a number average molecular weight from 6000 to 80,000;
   g) alkyl (meth)acrylate polymers and copolymers having a number average molecular weight from 100,000 to 1,000,000; and
   h) polyvinyl acetate having a number average molecular weight from 250,000 to 700,000,
   and wherein the enzyme-containing granulate has a pelleting stability greater than an uncoated enzyme-containing granulate.

8. The process of claim 1, wherein the organic polymer coating does not melt during pelletizing.

9. The process of claim 1, wherein the organic polymer is filler-free.

10. The process of claim 1, wherein the temperature during the coating process is from about 35 to 50° C.

11. The method of claim 1, wherein the coating is in the range from about 3 to 25% by weight of the total weight of the granulate.

12. A pelletized feedstuff composition obtained by the process of claim 1.

13. The method of claim 1, wherein the mixture further comprises at least one additive.

14. The composition of claim 7, wherein the mixture further comprises at least one additive.

15. The process of claim 1, wherein the temperature during the pelletizing process is in the range from about 60 to 100° C.

16. The method of claim 1, wherein the solid support is a low-molecular weight inorganic or organic compound selected from the group consisting of sodium chloride, calcium carbonate, sodium sulfate, magnesium sulfate, glucose, fructose, and sucrose.

17. The composition of claim 7, wherein the solid support is a low-molecular weight inorganic or organic compound selected from the group consisting of sodium chloride, calcium carbonate, sodium sulfate, magnesium sulfate, glucose, fructose, and sucrose.

* * * * *

UNITED STATES PATENT AND TRADEMARK OFFICE
CERTIFICATE OF CORRECTION

| | | |
|---|---|---|
| PATENT NO. | : 7,556,802 B1 | Page 1 of 1 |
| APPLICATION NO. | : 10/018339 | |
| DATED | : July 7, 2009 | |
| INVENTOR(S) | : Hans-Peter Harz et al. | |

It is certified that error appears in the above-identified patent and that said Letters Patent is hereby corrected as shown below:

Title Page in the References Cited:

In Foreign Patent Documents at page 2, left column, "WO 98/5490" should read -- WO 98/54980 --.

Signed and Sealed this

Sixth Day of October, 2009

David J. Kappos
*Director of the United States Patent and Trademark Office*